United States Patent
Cassell et al.

(10) Patent No.: US 10,189,960 B2
(45) Date of Patent: Jan. 29, 2019

(54) RUBBER VIBRATION DAMPING MATERIAL

(71) Applicants: Dow Global Technologies LLC, Midland, MI (US); Rohm and Haas Company, Philadelphia, PA (US)

(72) Inventors: Roger A. Cassell, South Haven, MI (US); Syed Z. Mahdi, Rochester Hills, MI (US); Parvinder S. Walia, Midland, MI (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 15/509,016

(22) PCT Filed: Dec. 10, 2015

(86) PCT No.: PCT/US2015/064878
§ 371 (c)(1),
(2) Date: Mar. 6, 2017

(87) PCT Pub. No.: WO2016/100059
PCT Pub. Date: Jun. 23, 2016

(65) Prior Publication Data
US 2017/0283564 A1  Oct. 5, 2017

Related U.S. Application Data

(60) Provisional application No. 62/092,303, filed on Dec. 16, 2014.

(51) Int. Cl.
| | |
|---|---|
| *C08L 9/00* | (2006.01) |
| *C08J 3/24* | (2006.01) |
| *C08C 19/18* | (2006.01) |
| *C08J 3/26* | (2006.01) |
| *C08K 3/06* | (2006.01) |

(52) U.S. Cl.
CPC ............... *C08J 3/246* (2013.01); *C08C 19/18* (2013.01); *C08J 3/26* (2013.01); *C08K 3/06* (2013.01); *C08L 9/00* (2013.01); *C08J 2307/00* (2013.01); *C08J 2309/00* (2013.01)

(58) Field of Classification Search
CPC .... C08J 3/246; C08J 2209/00; C08J 2307/00; C08K 3/06; C08G 61/02; C08L 65/00
See application file for complete search history.

(56) References Cited

U.S. PATENT DOCUMENTS

| | | | |
|---|---|---|---|
| 2,732,362 A * | 1/1956 | Ladd | C08K 5/02 525/292 |
| 3,268,475 A | 8/1966 | Hoch et al. | |
| 3,494,981 A | 2/1970 | Thorpe | |
| 3,640,941 A * | 2/1972 | Findley et al. | C08C 19/28 524/346 |
| 4,684,687 A | 8/1987 | Breach et al. | |
| 4,795,778 A * | 1/1989 | Bond et al. | C08C 19/18 524/364 |
| 5,904,220 A | 5/1999 | Shinichiro et al. | |
| 6,709,758 B2 | 3/2004 | Halladay et al. | |
| 7,171,940 B2 | 2/2007 | Rubel, Jr. et al. | |
| 2004/0063859 A1 | 4/2004 | Waddell et al. | |
| 2015/0031790 A1* | 1/2015 | Obrecht et al. | C08K 5/0025 523/156 |

FOREIGN PATENT DOCUMENTS

GB        748972        5/1956

* cited by examiner

*Primary Examiner* — Nathan M Nutter

(57) ABSTRACT

A vulcanized rubber is formed by a method comprising blending a halogenated unsaturated polymer into a rubber comprised of cis 1-4 polyisoprene to form a vulcanizable polymer blend, adding a vulcanization material to the vulcanizable polymer blend, and vulcanizing the vulcanizable polymer blend to form a homogeneous vulcanized rubber. The method may be used to form a vulcanized rubber comprised of polyisoprene uniformly crosslinked with a halogenated unsaturated polymer that is a reaction product of (i) an unsaturated polymer miscible with polyisoprene and having conjugated dienes that undergo a Diels Alder reaction and (ii) a polyhalogenated cyclopentadiene.

11 Claims, No Drawings

1

RUBBER VIBRATION DAMPING MATERIAL

Application PCT/US15/64878 claims the benefit of U.S. Provisional Application 62/092,303 filed on Dec. 16, 2014. The entire contents of these applications are incorporated herein by reference in their entirety.

FIELD OF INVENTION

The invention relates to vulcanized natural rubbers or its synthetic analogs (i.e., polyisoprene) having improved thermal degradation properties and their use in vibration damping applications in harsh conditions (e.g., automotive engine mounts and bushings).

BACKGROUND OF INVENTION

Vulcanized natural rubber is widely used in anti-vibration systems, such as automotive engine mounts, because of its excellent strength, fatigue resistance, high resilience and low level of strain sensitivity particularly at low temperatures. It is and has been the elastomer of choice for the majority of applications involving high stress and cyclic flexing. Unfortunately, vulcanized natural rubber tends to degrade when it is used in high temperature environments (>100° C.) and the temperatures in today's engine compartments are increasing in order to improve engine efficiency, with an industry target of at least 150° C. mentioned. With the industry driving to improve engine efficiencies, vulcanized natural rubber mounts may be more susceptible to early degradation and part failure.

To address the problem of vulcanized natural rubber thermal degradation, heat shields have been described, for example, in US Pat. Appl. No. 2006/0138300. Coatings have also been applied to vulcanized natural rubber to reduce their thermal degradation such as described in U.S. Pat. No. 6,709,758. Crosslinking modification and saturation of the double bonds have also been used to reduce the thermal degradation of vulcanized natural rubber, but these invariably have led to substantial reduction in desirable dynamic properties particularly at lower temperatures. Additives such as reversion modifiers and antioxidants have also been used such as described in *Accelerators and Reversion Modifiers for Natural Rubber* (Dr. Arie J. de Hoog, *Natuurrubber 9*, December 1997). Unfortunately, these methods suffer from reduced dynamic properties, complexity, increased weight, and limited improvement at higher application temperatures (i.e., desired underhood temperatures).

From the above, it would be desirable to provide a vulcanized natural rubber having similar dynamic properties to a vulcanized rubber using standard sulfur vulcanization methods that realizes improved thermal degradation properties and avoids one or more problems of the prior art such as those mentioned above.

SUMMARY OF INVENTION

A first aspect of the invention is a method of forming a vulcanized rubber comprising mixing a halogenated unsaturated polymer into a rubber comprised of cis 1-4 polyisoprene to form a vulcanizable polymer blend, adding a vulcanization material to the vulcanizable polymer blend, and vulcanizing the vulcanizable polymer blend to form a homogeneous vulcanized rubber.

A second aspect of this invention is a vulcanized rubber comprised of polyisoprene uniformly crosslinked with a halogenated unsaturated polymer that is a reaction product of (i) an unsaturated polymer miscible with polyisoprene and having conjugated dienes that undergo a Diels Alder reaction and (ii) a polyhalogenated cyclopentadiene represented by:

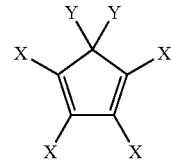

wherein X is a fluorine, chlorine or bromine and Y is fluorine, chlorine, bromine or alkoxy having 1 to 4 carbons.

A third aspect of the invention is a method of forming a vulcanized rubber solubilizing cis 1-4 polyisoprene with a polyhalogenated cyclopentadiene represented by:

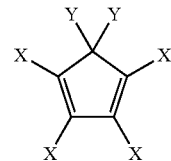

wherein X is a fluorine, chlorine or bromine and Y is fluorine, chlorine, bromine or alkoxy having 1 to 4 carbons to form a blend and vulcanizing the blend to form a homogeneous vulcanized rubber. In this aspect, it is believed, without being limiting, that some portion of the cis 1-4 polyisoprene undergoes a Diels Alder reaction of the second aspect during the vulcanization in situ.

It has been surprisingly found that when forming a vulcanized rubber particularly when using sulfur as the crosslinker or vulcanizer even at conventional levels that allow for excellent dynamic properties of a natural rubber (essentially 100% polyisoprene), a vulcanized rubber having desirable dynamic properties even at low temperatures may be formed while also achieving improved thermal degradation properties even at higher temperatures.

DETAILED DESCRIPTION OF INVENTION

The Halogenated Unsaturated Polymer

The halogenated unsaturated polymer is made by reacting an unsaturated polymer that has dienes that undergo Diels Alder reaction with a polyhalogenated cyclopentadiene represented by:

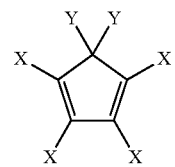

wherein X is a fluorine, chlorine or bromine and Y is fluorine, chlorine, bromine or alkoxy having 1 to 4 carbons. Unsaturated polymers include, for example, polybutadiene having at least about 30% cis 1-4 groups, and cis 1-4 polyisoprene. Preferably, the unsaturated polymer is cis 1-4 polyisoprene, polybutadiene having at least 80%, 90% or 95% 1-4 cis groups to essentially all the groups being cis 1-4 groups by weight. Typically the unsaturated polymer, particularly when such unsaturated polymer is polybutadiene, has a Mw (molecular weight average) from about 300,000 to about 3,500,000 g/mole and a Mn (molecular number average) from about 150,000 to about 175,000 g/mole.

The polyhalogenated cyclopentadiene may be useful to make the halogenated unsaturated polymer. Examples include hexachlorocyclopentadiene, hexabromoocyclopentadiene; 5,5-dibromotrethachlorocyclopentadiene; 5,5-difluorotetrachlorocyclopentadiene; 5,5-dimethoxytetrachlorocyclopentadiene; diethoxytetrachlorocyclopentadiene or mixture thereof. Preferably, the polyhalogenated cyclopentadiene is hexachlorocyclopentadiene.

During the reaction, because a halogen halide may be produced, an acid scavenger is typically used such as an eplihalohydrin (e.g., epichlorohydrin) or other epoxide compounds. Typically, the amount of the acid scavenger is from about 0.01% to 20% by weight of the total amount of the reactants (i.e., unsaturated polymer and polyhalogenated cyclopentadiene).

A control agent also may be used to control the extent of the reaction. The control agent may be a compound such as a nitro-substituted aromatic hydrocarbon, phenol or alkyl-substituted phenol. Examples of the nitro aromatic hydrocarbon include nitrobenzene, ortho-, meta, and para-di nitrobenzene, trinitrobenzene and 2,4-dinitrophenol as well as diphenyl-1-picrylhydrazine. Exemplary phenols include phenol, hydroquinone, catechol, resorcinol, and phloro-glucinol, as well as the quinone forms that exist, such as ortho- and parabenzoquinone. Examples of the alkyl-substituted phenols include meta- and para-isopropylphenol; 3,5-dimethylphenol; 3,5-diethylphenol; 3,5-sec-butylphenol; 3-ethyl-5-isopropylphenol; 2-methyl-4-isopropylphenol; 3,5-dicyclohexylphenol; 2,4,6-trimethylphenol; tertiary butyl catechol; para-cresol; 5-isopropyl resorcinol; 4-n-propyl resorcinol; 4-n-nonyl resorcinol; 4-n-hexylresorcinol and toluhydroquinone. Generally, the alkyl substituents have up to ten carbons. When used, the amount of control agent typically is a small amount such as about 0.001% to about 1% by weight of the total amount of reactants (the unsaturated polymer and polyhalogenated cyclopentadiene).

A solvent may also be used in the reaction, but is not required. Solvents that may be used include, for example, aliphatic, cycloaliphatic and aromatic hydrocarbons such as hexane, iso-octane, normal decane, benzene, toluene, xylene, cyclo-hexane, methylcyclohexane and the like; chlorinated hydrocarbons such as chloroform, trichloroethylene, dichloropropane, tetrachloroethane propylene dibromide, trichlorobenzene, benzotrichloride, the chloro toluenes and the like; ketones such as diethylketone, methylpropylketone, mesityl oxide and the like; esters such as isobutyl acetate, amyl acetate, butyl propionate, ethyl butyrate and the like. Mixtures of the various solvents may also be used. The aromatic hydrocarbons are preferred. It is also preferred that the boiling point of the solvent not exceed about 200° C. to facilitate removal from the unreacted halocyclopentadiene. The ratio of solvent used in the reaction mixture generally does not exceed about 100 parts by weight of the unsaturated polymer and polyhalogenated cyclopentadiene.

The reaction proceeds best at elevated temperatures such as 70° C. or 100° C. to 200° C. or 180° C. The reaction may be carried out at a useful pressure, but desirably is performed at or near ambient pressures (~1 atm).

The unsaturated polymer and polyhalogenated cyclopentadiene are provided in an amount and reacted for a time sufficient to form the halogenated unsaturated polymer. This typically means that the time is from several minutes to several days, but tends to be from 30 minutes or 1 hour to 48 or 36 hours. The molar ratio of the amount of polyhalogenated cyclopentadiene/unsaturated polymer may be in excess of the amount of double bonds in the unsaturated polymer that react with the polyhalogenated cyclopentadiene. Typically, the polyhalogenated cyclopentadiene/unsaturated polymer molar ratio is at least 1 to 20, 10 or 5. Generally, the molar ratio and reaction conditions are such that the amount of halogen and desirably Cl in the halogenated unsaturated polymer reaction product is from about 5%, 10%, 15%, 20% to 60%, 50%, 40% or 30%.

Forming the Vulcanized Rubber

In making the vulcanized rubber of the present invention, the halogenated unsaturated polymer is mixed into a rubber comprised of cis 1-4 polyisoprene to form a vulcanizable polymer blend. The cis 1-4 polyisoprene containing rubber may be any suitable rubber having a sufficient amount of cis 1-4 units to realize the desired mechanical properties. Typically, the amount of cis 1-4 units is at least about 30%, but desirably is at least 90%, 95% or essentially all cis 1-4 units by weight of said rubber. The rubber comprised of cis 1-4 polyisoprene may be any known natural rubber or synthetic polyisoprene rubber such as those known in the art and further described by Morton, M. 2009, Elastomers, Synthetic, Survey, Kirk-Othmer Encyclopedia of Chemical Technology. 1-20 and Baker, C.S.L, Fulton, W.S. and Updated by Staff 2012, Rubber Natural. Kirk-Othmer Encyclopedia of Chemical Technology, 1-28.

The blending may be performed in any suitable mixing apparatus known in the art such as rubber mills and Banbury mixers. The blending may be performed at any temperature typical in the rubber arts such as from room temperature (~20° C.) to about 150° C. The amount of time may be any amount necessary to sufficiently blend the halogenated unsaturated polymer into the cis 1-4 polyisoprene containing rubber to the vulcanizable polymer blend. Typically, the time is as short as practicable and, for example, is from several minutes to 1, 2, 5, 10 or 24 hours. The halogenated unsaturated polymer is suitably mixed when the vulcanizable polymer blend has a uniform consistency with no obvious phase separation by eye.

The halogenated unsaturated polymer and rubber comprised of cis 1-4 polyisoprene are provided in a ratio sufficient to provide improved thermal degradation while retaining in essence the same or to a large extent the desired mechanical (dynamic) properties of the vulcanized rubber. The particular ratio depends, for example, on the amount of halogen in the halogenated unsaturated polymer and the particular properties desired. Generally, the halogenated unsaturated polymer/rubber ratio by weight varies from about 0.01 to 1. Typically, the ratio is from about 0.05 or 0.1 to about 0.5 or 0.25. The ratio generally realizes an amount of halogen in the vulcanized rubber of about 1% to 25% by weight of the total weight of the vulcanized rubber (total weight includes all materials retained and used to make the rubber and includes, for example, vulcanization materials as well as other additives such as fillers).

To crosslink or vulcanize the vulcanizable polymer blend, vulcanization material is added. The addition of the vulcanization material may occur at any convenient point such as when mixing the halogenated unsaturated polymer and polyisoprene containing rubber or after this have become blended together. It has surprisingly been found that conventional vulcanization may be used allowing for desired mechanical properties that such vulcanizing offers, while also realizing much improved thermal degradation properties. "Conventional vulcanizing" means that the cross-linking agent is elemental sulfur, insoluble sulfur, an accelerator and a cross-linking activator such as zinc oxide combined with a fatty acid such as stearic acid, zinc laurate, zinc stearate or zinc 2-ethoxylhexoate. In such a conventional vulcanization, the ratio of the accelerator to sulfur (accelerator/sulfur) by weight is typically from 0.05 to 0.5 and the amount of sulfur is sufficient to realize mostly crosslinks that are polysulfidic (e.g., sulfur is present in an amount from 0.1 parts to 5 parts by weight of the vulcanizable polymer blend). "Polysulfidic" means the cross-link has at least 3 sulfur atoms to typically at most about 8 sulfur atoms.

The ratio may however be other ratios such as those typically characterized as efficient or semi-efficient vulcanization wherein there is a corresponding decrease in polysulfidic cross-links and decrease in the dynamic properties of the rubber, but with further improved thermal degradation properties. For example, the ratio of accelerator to sulfur may be greater than 0.5 to 10 or 5.

The accelerator, when employing vulcanization using sulfur to cross-link, may be any suitable accelerator such as those known in the art including sulfenamides, thiazoles, thiuram sulfides, dithiocarbamates and guanidines. Examples of accelerators include 2-mercaatptbenzothiazole; bis(2,2'-benzothiazolyl)disulfide; zinc 2-mercaptobenzothiazole; N-tert-butyl-2-benzothiazolesulfenamide; N-cyclohexyl-2-benzothiazolesulfenamide; N-oxydiethylene-2-benzothiazolesulfenamide; 4-morpholinyl-2-benzothiazole disulfide; N-dicyclohexyl-2-benzothiazolesulfenamide; N-tert-butyl-2-benzothiazolesulfenimide; N-oxydiethylenethiocarbamyl-N-oxydiethylenesulfenamide; N-oxydiethylenethiocarbamyl-N-oxydiethylenesulfenamide; cadmium diethyldithiocarbamate; copper dimethyldithiocarbamate; lead diamyldithiocarbamate; lead dimethyldithiocarbamate; piperidinium; pentamethylenedithiocarbamate; selenium dimethyldithiocarbamate; sodium di-n-butyldithiocarbamate; tellurium diethyldithiocarbamate; zinc diamyldithiocarbamate; zinc dibenzyldithiocarbamate; zinc di-n-butyldithiocarbamate: zinc di-iso-butyldithiocarbamate: zinc diethyldithiocarbamate; zinc dimethyldithiocarbamate; zinc di-iso-nonyldithiocarbamate; zinc pentamethyldithiocarbamate; and dipentamethylenethiuram disulfide.

Other cross-linkers other than sulfur may be used depending on the properties desired, but for applications requiring good dynamic properties (mechanical properties related repeating stress/strain typically sinusoidal at varying frequencies and in particular the ability to dampen vibrations in engine mount applications) sulfur is generally preferred. Other cross-linking compounds that may be used include, for example, 4,4-dithiodimorpholine, N,N-caprolactam disulfide, dicumyl peroxide, 2,5-dimethyl-2,5-di(tbutylperoxy) hexane, 2,5-dimethyl-2,5-di(tbutylperoxy)hexyne, 2,5-dimethyl-2,5-di(benzoylperoxy)hexane, 2,2-bis(t-butylperoxy)-di-isopropylbenzene, 1,1-bis(t-butylperoxy)-3,3,5-trimethylcyclo-hexane, n-butyl 4,4-bis(t-butyl-peroxy) valerate, t-butyl-perbenzoate, benzoyl peroxide, para-quinone dioxime, alkylphenol disulfide, methylolphenol-formaldehyde resin, brominated alkylphenol formaldehyde resin, 2-mercapto-1,3,4-thia-diazole-5-thiobenzoate, 5,5-thiobis-1,3,4-thia-diazole-2(3H)thione, trithiocyanuric acid, hexamethylenediamine carbamate, N,N-dicinnamylidene-1, 6-hexanediamine, 4,4-methylenebis-(cyclohexylamine)carbamate, 4,4-methylenedianiline, hexamethylene-1,6-bis-thiosulfate, disodium salt, 3-bis(ditraconimido-methyl) benzene, and N,N-meta-phenylenebis-maleimide.

Other useful additives may be employed when vulcanizing including adhesion promoters, antidegradants, processing agents, activators and retarders, fillers and reversion inhibitors and the like that are known in the industry. Activators and retarders such as magnesium oxide, lead monoxide, lead tetroxide, calcium oxide, zinc carbonate, phthalic anhydride benzoic acid, salicylic acid, N-(cyclohexyl-thio)phthalimide, and tetra-iso-butyl thiurammonosulfide may be employed. Processing agents may be employed to assist in making the viscosity of vulcanizable polymer blend more workable. Examples include arenemercaptans, arenesulfonic acids, pentachlorothiophenol or its zinc salt and dithiobenzanilide or its zinc salt, clay, oils and waxes. Antidegradants may include N-isopropyl-N'-phenylene diamine, N-(1,3-dimethylbutyl)-N'-phenyl-p-phenylene diamine, octylated diphenylamine, 2,2,4-trimethyl-1,2-dihydroquinoline, polymerized, and 2,2'-methylene-bis-(4-methyl-6-tert.-butylphenol). Anti-reversion agents may also be used. These agents inhibit or repair breaks of the polysulfidic cross links in conventional vulcanization and may include PERKALINK 900 (1,3-bis(citraconimidomethyl)benzene) available from Lanxess GmbH, Germany and DURALINK HTS (Hexamethylene-1,6-bis(thiosulfate) available from Eastman Chemical Comp., Kingsport, Tenn.

Fillers may be used in any amount to achieve the desired mechanical properties. Typically, the filler is a carbon black, which includes any carbon having a submicron particulate size formed from any number of hydrocarbon sources (e.g., oil, natural gas or acetylene). Likewise, other inorganic fillers may be used such as silica and in particular fumed silica and other inorganic particulates such as calcium carbonate. The amount of fillers typically is present in an amount in the vulcanized rubber from about 5 to 75% by weight of the total weight of the vulcanized rubber.

The vulcanization temperature may be any suitable temperature, but generally is from 100° C. to 200° C. and typically from 120 or 140° C. to 190 or 180° C. The vulcanization may be performed at any pressure, but typically is performed under ambient pressures or slightly elevated pressures, such as up to 100 pounds per square inch. The time may be suitable or practicable such as several minutes to a day or two and may depend on many factors such as size of the component being vulcanized and the ultimate properties desired.

The Vulcanized Rubber

The method of the invention forms a vulcanized rubber comprised of polyisoprene uniformly cross-linked with the halogenated unsaturated polymer described above. "Uniformly" means that the halogenated unsaturated polymer and polyisoprene were compatible as described above, which is believed to lead to a crosslinking of the two polymers on a molecular scale. The uniformity may be assessed, for example, by pulverizing or rending the vulcanized rubber into a powder having an average particle size on the order of 1 to 10 micrometers and analyzing a random sampling of the powder particles for halogen content. Typically, the standard deviation will be within 20% of the mean of the average of the halogen detected.

The vulcanized rubber desirably has an amount of halogen that is at least about 5 phr (parts per hundred by weight), 10 phr, or 20 phr, to at most about 35 phr of the total weight of the vulcanized rubber including fillers and other additives.

The vulcanized rubber typically will have dynamic properties that are within 20%, 10% or even 5% of a rubber made in the same manner using only the rubber comprised of cis 1-4 polyisoprene (in the absence of any other rubber polymer including the halogenated unsaturated polymer). The vulcanized rubber generally will have substantially improved thermal degradation characteristics. "Improved degradation properties" means that desired mechanical properties will be maintained longer without the same degree of degradation or that the temperature where similar degradation occurs is at a higher temperature. Typically, the degradation characteristics are improved by 10%, 20%, or even 50% or even more. That is the time realizing the same dynamic property decrease is 10%, 20, or even 50% or even longer.

Test Methods

Tensile Strength:

Tensile strength was determined as per ASTM D573.

Elongation:

Elongation was determined as per ASTM D573.

Shore Hardness:

Shore hardness was determined by ASTM 240

TABLE 1

| Name | Description | Company |
|---|---|---|
| SIR 3CV60 | Natural Rubber | Alton |
| HCCP | Hexachlorocyclopentadiene | Velsicol Corporation |
| N-550 | Carbon Black | Cabot |
| Santoflex ™ 6PPD Liquid | N-(1,3-Dimethylbutyl)-N'-phenyl-1,4-benzenediamine (AO) | Flexsys America |
| TMQ | TMQ Powder (2,2,4-trimethyl-1,2-dihydroquinoline) (AO) | ChemSpec Ltd |
| HM 97-Wax | Polyethylene wax | Struktol |
| CTP | N-(cyclhexyl thio) phthalimide Antiscorching agent | Akrochem |
| Zinc Oxide | | Rhein-Chemie |
| Steric Acid | | Sigma-Aldrich |
| Sulfur | | Sigma-Aldrich |
| CBS | N-Cyclohexyl-2-benzothiazolesulfenamide | Harwick Standard |
| Doverphos 10 | Triphenylphosphate (TPP) | Dover Chemical |
| Polybutadiene | 1-4 cis polybutadiene | Rhein-Chemie (Lanxess Corporation) |
| TBBS | N-Tertiarybutyl-2-benzothiazaole sulfennamide | Harwick Standard |
| TMTD | Tetramethylthiuram disulfide | Harwick Standard |

EXAMPLE 1

Preparation of the Halogenated Polymer

The halogenated polymer was synthesized by reacting 1,4 polybutadiene (PBD) and hexachlorocyclopentadiene (HCCP) via inverse electron demand [4+2] cycloaddition (Diels-Alder) reaction at a ratio of PBD:HCCP=1:1.35 by wt. at ~12.5% HCCP grafting of 32-34% solids.

In a one liter flask under a nitrogen purge, 97 grams of 1,4 polybutadiene (PBD) and 641 grams of Hi Sol 10 (mixture of aromatic solvents available from Rodda Paint Co., Portland, Oreg.) were added to a vessel. The mixture was heated to 120° C. and agitated until all of the PBD was dissolved. Then 264 grams of HCCP was added to the blend and heated to 150° C. and reacted under nitrogen. During the reaction, Hi Sol is added to maintain the volume of the blend as needed. The reaction was carried out until the % solids of reaction product reached 31.5% by weight. % solids is determined using viscometry. Once the % solids is realized, the halogenated polymer was separated from the Hi Sol 10 by filtering and dried at ambient temperature until essentially no further unreacted HCCP or Hi Sol is present.

Vulcanization

The Example 1 formulation shown in Table 2 was vulcanized by charging the natural rubber and halogenated polymer into a mixer at 40° C. and then adding the zinc oxide, steric acid and wax and mixing for 2 minutes. The carbon black was then added and the mixture mixed for 4 minutes. Following this mixing, the sides of the container were scraped and the antioxidants TMQ and 6PPD were added and the mixture was mixed for 1 more minute. This mixture was pressed into strips and cooled for at least 8 hours.

The cooled mixture was then mixed with the sulfur, TBBS and TMTD in the amounts shown in Table 2. This mixture was then compression molded into test specimens at 160° C. for a time of 10 to 30 minutes depending on the particular formulation.

The vulcanized rubber was tested as made and after aging for differing times and temperatures as shown in Table 3. Likewise, the results of the testing are also shown in Table 3.

EXAMPLES 2-6 AND COMPARATIVE EXAMPLES 1-6

Examples 2-6 and Comparative Examples 1-6 were made in the same way using the same polyhalogenated polymer as Example 1 except that the formulations were changed as shown in Table 2. The testing results for these are shown in Table 3. From the results shown in Table 3, the use of the polyhalogenated polymer in the vulcanized rubber exhibits improved retention of elongation properties when made with the same amount of vulcanizing sulfur. Likewise, improved retention of properties are shown when using greater amounts of sulfur (conventional vulcanization), which is expected to retain improved damping properties too.

TABLE 2

| Example # | 1 | 2 | 3 | 4 | 5 | 6 | Comp. 1 | Comp. 2 | Comp. 3 | Comp. 4 | Comp. 5 | Comp. 6 |
|---|---|---|---|---|---|---|---|---|---|---|---|---|
| Cure System | CV | Semi-EV | EV | EV | EV | EV | CV | Semi-EV | EV | EV | EV | EV |
| Material | gms | gms | gms | gms | gms | gms | gms | gms | gms | gms | gms | gms |
| SIR 3CV60 | 725 | 725 | 725 | 453 | 716 | 693 | 906 | 900 | 900 | 903 | 903 | 725 |
| Y-1736 | 181 | 181 | 181 | 453 | 179 | 173 | | | | | | |
| N-550 | 390 | 390 | 390 | 390 | 385 | 373 | 390 | 390 | 390 | 388 | 388 | 390 |
| Zinc Oxide | 45 | 45 | 45 | 45 | 45 | 87 | 45 | 45 | 45 | 45 | 45 | 45 |
| Steric Acid | 18 | 18 | 18 | 18 | 18 | 17 | 18 | 18 | 18 | 18 | 18 | 18 |
| HM 97 -Wax. | 18 | 18 | 18 | 18 | 18 | 17 | 18 | 18 | 18 | 18 | 18 | 18 |
| 6-PPD | 14 | 14 | 14 | 14 | 13 | 13 | 14 | 14 | 14 | 13.5 | 13.5 | 14 |
| TMQ | 9 | 9 | 9 | 9 | 9 | 9 | 9 | 9 | 9 | 9 | 9 | 9 |

TABLE 2-continued

| Example # | 1 | 2 | 3 | 4 | 5 | 6 | Comp. 1 | Comp. 2 | Comp. 3 | Comp. 4 | Comp. 5 | Comp. 6 |
|---|---|---|---|---|---|---|---|---|---|---|---|---|
| Doverphos 10 | | | | | 18 | 17 | | | | | | |
| Polybutadiene | | | | | | | | | | | | 181 |
| Valcuren | | | | | | | | | | 4.5 | | |
| Perkalink-900 | | | | | | | | | | | 4.5 | |
| TBBS | 6.3 | 14.5 | 18.1 | 18.1 | 17.9 | 17.3 | 6.3 | 14.5 | 18.1 | 18.1 | 18.1 | 18.1 |
| TMTD | 4.5 | | 18.1 | 18.1 | 17.9 | 17.3 | 4.5 | | 18.1 | 18.1 | 18.1 | 18.1 |
| Sulfur | 15.4 | 10.9 | 1.8 | 1.8 | 1.8 | 1.7 | 15.4 | 10.9 | 1.8 | 1.8 | 1.8 | 1.8 |

CV = conventional vulcanization;
EV = Efficient vulcanization;
Semi EV = Semi-Efficient vulcanization

TABLE 3

| Reference # | Aging | Tensile (MPa) | stdev Tensile (MPa) | % Retention Tensile | Elongation (%) | % Retention Elongation | Shore A Hardness |
|---|---|---|---|---|---|---|---|
| Example 1 | Not heat aged | 21 | 0.72 | 100 | 354 | 100 | 72 |
| Example 1 | 1 day heat aged at 120° C. | 11 | 1.43 | 51 | 149 | 42 | 78 |
| Example 1 | 3 days heat aged at 120° C. | 6 | 0.26 | 30 | 93 | 26 | 76 |
| Example 1 | 7 days heat aged at 100° C. | 12 | 2 | 58 | 162 | 46 | 78 |
| Example 1 | 10 days heat aged at 90° C. | 13 | 1.29 | 64 | 178 | 50 | 79 |
| Example 1 | 20 days heat aged at 85° C. | 15 | 1.89 | 74 | 178 | 50 | 81 |
| Example 1 | 30 days heat aged at 70° C. | 17 | 1.75 | 80 | 213 | 60 | |
| Example 2 | Not heat aged | 22 | 1 | 100 | 418 | 100 | 67 |
| Example 2 | 1 day heat aged at 120° C. | 15 | 0.86 | 68 | 222 | 53 | 74 |
| Example 2 | 3 days heat aged at 120° C. | 11 | 1.31 | 50 | 145 | 35 | 73 |
| Example 2 | 7 days heat aged at 100° C. | 16 | 0.65 | 72 | 228 | 54 | 73 |
| Example 2 | 10 days heat aged at 90° C. | 19 | 1 | 85 | 271 | 65 | 74 |
| Example 2 | 20 days heat aged at 85° C. | 18 | 0.73 | 78 | 262 | 63 | 74 |
| Example 2 | 30 days heat aged at 70° C. | | | | | | |
| Example 3 | Not heat aged | 21 | 1.8 | 100 | 378 | 100 | 72 |
| Example 3 | 1 day heat aged at 120° C. | 16 | 1.04 | 77 | 242 | 64 | 75 |
| Example 3 | 3 days heat aged at 120° C. | 13 | 0.59 | 61 | 196 | 52 | 75 |
| Example 3 | 7 days heat aged at 100° C. | 17 | 3 | 82 | 242 | 64 | 77 |
| Example 3 | 10 days heat aged at 90° C. | 18 | 1.62 | 86 | 253 | 67 | 77 |
| Example 3 | 20 days heat aged at 85° C. | 17 | 1.96 | 83 | 244 | 65 | 77 |
| Example 3 | 30 days heat aged at 70° C. | 17 | 2.47 | 84 | 302 | 80 | |
| Example 4 | Not heat aged | 22 | 0.96 | 100 | 360 | 100 | 74 |
| Example 4 | 1 day heat aged at 120° C. | 15 | 1.26 | 70 | 200 | 55 | 82 |
| Example 4 | 3 days heat aged at 120° C. | 14 | 2.37 | 65 | 178 | 49 | 82 |
| Example 4 | 7 days heat aged at 120° C. | 12 | 1.16 | 54 | 127 | 35 | 85 |
| Example 4 | 7 days heat aged at 100° C. | 16 | 1.56 | 71 | 181 | 50 | 82 |
| Example 4 | 10 days heat aged at 90° C. | 15 | 1.88 | 67 | 176 | 49 | 83 |
| Example 4 | 20 days heat aged at 85° C. | 17 | 1.61 | 77 | 208 | 58 | 85 |
| Example 4 | 30 days heat aged at 70° C. | 17 | 0.82 | 77 | 225 | 62 | |
| Example 5 | Not heat aged | 21 | 1.5 | 100 | 428 | 100 | 66 |
| Example 5 | 1 day heat aged at 120° C. | 15 | 1.53 | 71 | 266 | 62 | 73 |
| Comp. Ex. 3 | 30 days heat aged at 70° C. | 18 | 0.68 | 85 | 359 | 83 | |
| Example 5 | 3 days heat aged at 120° C. | 12 | 1.07 | 59 | 224 | 52 | 74 |
| Example 5 | 7 days heat aged at 100° C. | 14 | 3 | 68 | 246 | 57 | 75 |
| Example 5 | 10 days heat aged at 90° C. | 17 | 2.1 | 82 | 275 | 64 | 74 |
| Example 5 | 20 days heat aged at 85° C. | 16 | 1.86 | 76 | 247 | 58 | 75 |
| Example 5 | 30 days heat aged at 70° C. | 20 | 1.72 | 96 | 381 | 89 | |
| Example 6 | Not heat aged | 18 | 0.4 | 100 | 433 | 100 | 64 |
| Example 6 | 1 day heat aged at 120° C. | 16 | 1.39 | 91 | 301 | 69 | 72 |
| Example 6 | 3 days heat aged at 120° C. | 10 | 2.35 | 58 | 210 | 48 | 72 |
| Example 6 | 7 days heat aged at 120° C. | 5 | 0.52 | 30 | 138 | 32 | 70 |
| Example 6 | 7 days heat aged at 100° C. | 16 | 0.93 | 89 | 288 | 66 | 74 |
| Example 6 | 10 days heat aged at 90° C. | 17 | 0.88 | 94 | 295 | 68 | 74 |
| Example 6 | 20 days heat aged at 85° C. | 16 | 1.27 | 91 | 293 | 68 | 74 |
| Example 6 | 30 days heat aged at 70° C. | 18 | 1.45 | 102 | 374 | 86 | |
| Comp. Ex. 1 | Not heat aged | 23 | 0.18 | 100 | 464 | 100 | 65 |
| Comp. Ex. 1 | 1 day heat aged at 120° C. | 9 | 1.43 | 40 | 179 | 39 | 68 |
| Comp. Ex. 1 | 3 days heat aged at 120° C. | 4 | 0.62 | 17 | 83 | 18 | 62 |
| Comp. Ex. 1 | 7 days heat aged at 100° C. | 11 | 1.88 | 49 | 189 | 41 | 69 |
| Comp. Ex. 1 | 10 days heat aged at 90° C. | 14 | 1.78 | 62 | 238 | 51 | 71 |
| Comp. Ex. 1 | 20 days heat aged at 85° C. | 14 | 0.78 | 58 | 223 | 48 | 71 |
| Comp. Ex. 1 | 30 days heat aged at 70° C. | 18 | 2.1 | 77 | 307 | 66 | |
| Comp. Ex. 2 | Not heat aged | 23 | 0.4 | 100 | 482 | 100 | 62 |
| Comp. Ex. 2 | 1 day heat aged at 120° C. | 16 | 1.18 | 72 | 286 | 59 | 69 |
| Comp. Ex. 2 | 3 days heat aged at 120° C. | 9 | 1.33 | 40 | 163 | 34 | 67.5 |
| Comp. Ex. 2 | 7 days heat aged at 100° C. | 18 | 0.82 | 80 | 307 | 64 | 70 |
| Comp. Ex. 2 | 10 days heat aged at 90° C. | 19 | 1.05 | 82 | 332 | 69 | 69 |
| Comp. Ex. 2 | 20 days heat aged at 85° C. | 18 | 1.21 | 81 | 342.8 | 71 | 70 |

TABLE 3-continued

| Reference # | Aging | Tensile (MPa) | stdev Tensile (MPa) | % Retention Tensile | Elongation (%) | % Retention Elongation | Shore A Hardness |
|---|---|---|---|---|---|---|---|
| Comp. Ex. 2 | 30 days heat aged at 70° C. | 21 | 1.73 | 92 | 386 | 80 | |
| Comp. Ex. 3 | Not heat aged | 21 | 0.66 | 100 | 434 | 100 | 63 |
| Comp. Ex. 3 | 1 day heat aged at 120° C. | 18 | 0.37 | 85 | 322 | 74 | 69 |
| Comp. Ex. 3 | 3 days heat aged at 120° C. | 15 | 1.13 | 71 | 262 | 60 | 67 |
| Comp. Ex. 3 | 7 days heat aged at 120° C. | 6 | 0.75 | 30 | 154 | 35 | 64 |
| Comp. Ex. 3 | 7 days heat aged at 100° C. | 18 | 0.97 | 84 | 304 | 70 | 70 |
| Comp. Ex. 3 | 10 days heat aged at 90° C. | 18 | 1.65 | 85 | 335 | 77 | 70 |
| Comp. Ex. 3 | 20 days heat aged at 85° C. | 17 | 1.85 | 80 | 314 | 72 | 70 |
| Comp. Ex. 4 | Not heat aged | 24 | 0.11 | 100 | 447 | 100 | 62 |
| Comp. Ex. 4 | 1 day heat aged at 120° C. | 17 | 0.675 | 73 | 304 | 68 | 68 |
| Comp. Ex. 4 | 3 days heat aged at 120° C. | 15 | 1.21 | 63 | 257 | 57 | 65 |
| Comp. Ex. 4 | 7 days heat aged at 120° C. | 7 | 0.23 | 31 | 180 | 40 | 63 |
| Comp. Ex. 4 | 7 days heat aged at 100° C. | 18 | 0.54 | 76 | 306 | 68 | 68 |
| Comp. Ex. 4 | 10 days heat aged at 90° C. | 18 | 1 | 78 | 316 | 71 | 68 |
| Comp. Ex. 4 | 20 days heat aged at 85° C. | 18 | 1.06 | 75 | 329 | 74 | 70 |
| Comp. Ex. 4 | 30 days heat aged at 70° C. | 19 | 0.68 | 82 | 389 | 87 | |
| Comp. Ex. 5 | Not heat aged | 21 | 1.63 | 100 | 415 | 100 | 63 |
| Comp. Ex. 5 | 1 day heat aged at 120° C. | 15 | 1.14 | 70 | 271 | 65 | 66 |
| Comp. Ex. 5 | 3 days heat aged at 120° C. | 11 | 1.92 | 53 | 224 | 54 | 66 |
| Comp. Ex. 5 | 7 days heat aged at 120° C. | 8 | 0.47 | 35 | 198 | 48 | 64 |
| Comp. Ex. 5 | 7 days heat aged at 100° C. | 17 | 3 | 77 | 279 | 67 | 66 |
| Comp. Ex. 5 | 10 days heat aged at 90° C. | 16 | 1.603 | 77 | 295 | 71 | 70 |
| Comp. Ex. 5 | 20 day heat aged at 85° C. | 17 | 1.389 | 78 | 283 | 68 | 70 |
| Comp. Ex. 5 | 30 days heat aged at 70° C. | 19 | 0.58 | 89 | 358 | 86 | |
| Comp. Ex. 6 | Not heat aged | 22 | 0.36 | 100 | 443 | 100 | 64 |
| Comp. Ex. 6 | 1 day heat aged at 120° C. | 16 | 0.79 | 75 | 304 | 69 | 69 |
| Comp. Ex. 6 | 3 days heat aged at 120° C. | 15 | 0.77 | 69 | 266 | 60 | 68 |
| Comp. Ex. 6 | 7 days heat aged at 120° C. | 7 | 0.16 | 33 | 173 | 39 | 65 |
| Comp. Ex. 6 | 7 days heat aged at 100° C. | 18 | 1.33 | 83 | 288 | 65 | 70 |
| Comp. Ex. 6 | 10 days heat aged at 90° C. | 15 | 1.65 | 67 | 264 | 60 | 70 |
| Comp. Ex. 6 | 20 days heat aged at 85° C. | 17 | 0.84 | 76 | 297 | 67 | 70 |
| Comp. Ex. 6 | 30 days heat aged at 70° C. | 18 | 1.52 | 82 | 343 | 77 | 82 |

The invention claimed is:

1. A vulcanized rubber comprised of polyisoprene uniformly crosslinked with a halogenated unsaturated polymer that is a reaction product of (i) an unsaturated polymer that is miscible with polyisoprene and has conjugated dienes that undergo a Diels Alder reaction and (ii) a polyhalogenated cyclopentadiene represented by:

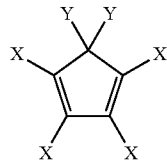

wherein X is a fluorine, chlorine or bromine and Y is fluorine, chlorine, bromine or alkoxy having 1 to 4 carbons.

2. The vulcanized rubber of claim 1, wherein the amount of halogen in the halogenated unsaturated polymer is 5 percent to 60 percent by weight of the halogenated unsaturated polymer.

3. The vulcanized rubber of claim 1, wherein the vulcanized rubber is crosslinked with sulfur.

4. The vulcanized rubber of claim 3, wherein the sulfur is present in the vulcanized rubber in an amount from 0.1 percent to 5 percent by weight of the vulcanized rubber.

5. The vulcanized rubber of claim 1, wherein the unsaturated polymer is polybutadiene comprised of at least 30% by weight 1-4 cis butadiene units.

6. The vulcanized rubber of claim 5, wherein the polybutadiene has at least 90% by weight 1-4 cis butadiene units.

7. A method of forming a vulcanized rubber of claim 1 comprising:

a) mixing a halogenated unsaturated polymer into polyisoprene to form a vulcanizable polymer blend, wherein the halogenated unsaturated polymer is a reaction product of (i) an unsaturated polymer that is miscible with polyisoprene and has conjugated dienes that undergo a Diels Alder reaction and (ii) a polyhalogenated cyclopentadiene represented by:

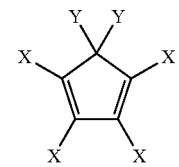

wherein X is a fluorine, chlorine or bromine and Y is fluorine, chlorine, bromine or alkoxy having 1 to 4 carbons, b) adding a vulcanization material to the vulcanizable polymer blend, and c) vulcanizing the vulcanizable polymer blend to form the vulcanized rubber.

8. The method of claim 7, wherein the vulcanization material is sulfur, a compound of sulfur, or a peroxide.

9. The method of claim 8, wherein the vulcanization material is sulfur.

10. The method of claim 7, wherein the polyhalogenated cyclopentadiene is hexachlorocyclopentadiene, hexabromoocyclopentadiene; 5,5-dibromotetrachlorocyclopentadiene; 5, 5 - difluorotetrachlorocyclop entadiene; 5,5-dibromotetrachlorocyclopentadiene; diethoxytetrachlorocyclopentadiene or mixture thereof.

11. The method of claim 10, wherein the polyhalogenated cyclopentadiene is hexachlorocyclopentadiene.

* * * * *